Feb. 10, 1931.  S. J. ROELIKE  1,792,324
MUSICAL KEY CHART
Filed Nov. 14, 1928   2 Sheets-Sheet 1
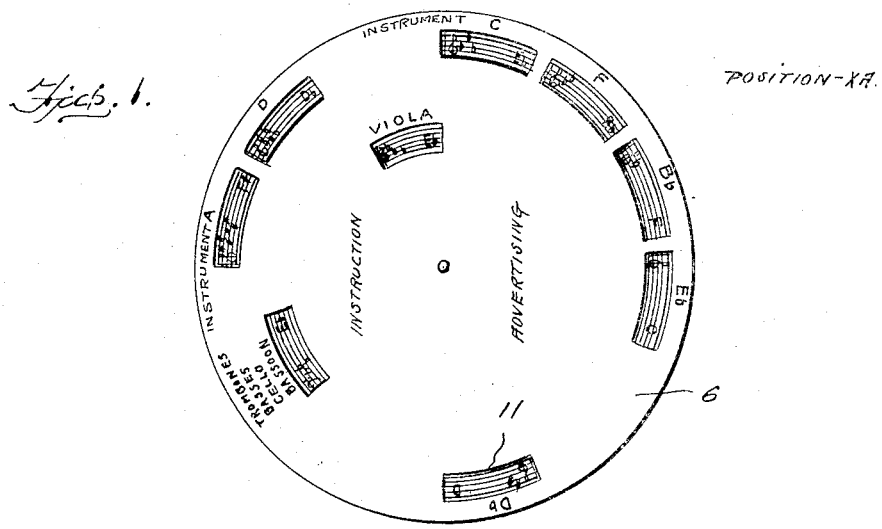
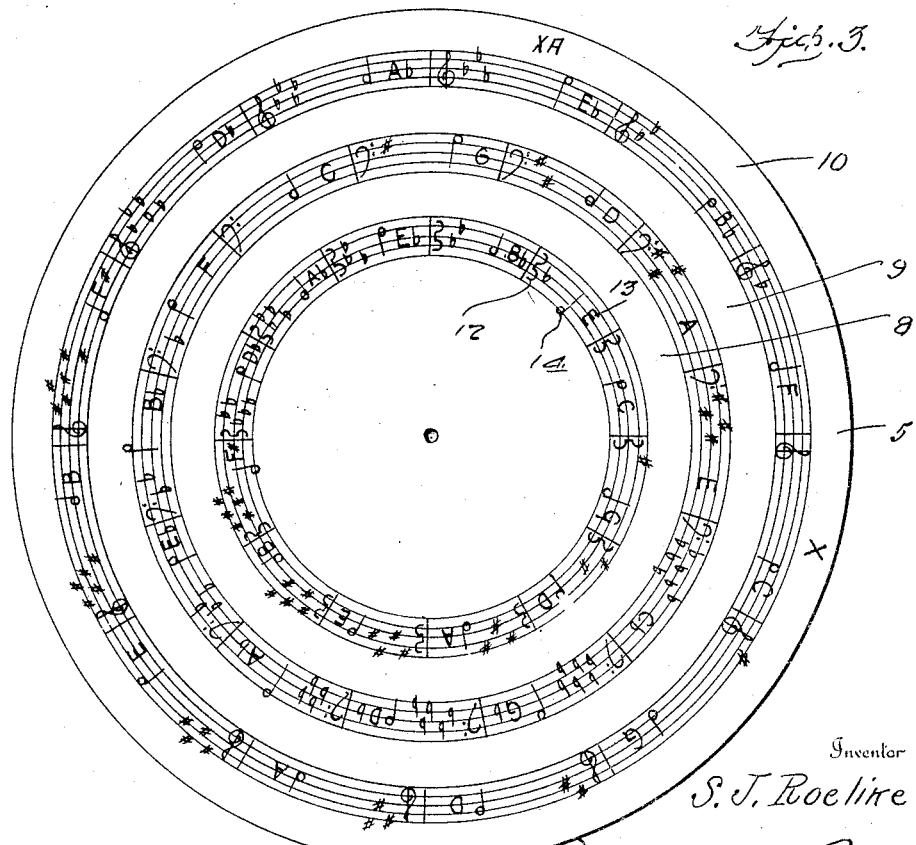

Feb. 10, 1931.   S. J. ROELIKE   1,792,324
MUSICAL KEY CHART
Filed Nov. 14, 1928    2 Sheets-Sheet 2

POSITION-X

Inventor
S. J. Roelike

By Clarence A. O'Brien
Attorney

Patented Feb. 10, 1931

1,792,324

UNITED STATES PATENT OFFICE

STEPHEN J. ROELIKE, OF MELROSE, MINNESOTA

MUSICAL KEY CHART

Application filed November 14, 1928. Serial No. 319,302.

This invention relates to a small appliance, designed especially for use by orchestra and band conductors, music teachers, and instructors, and by individual performers, and it has particular reference to novel means for instantly and accurately showing, at a glance, and without confusion, the relative keys of various instruments when playing in a given main key, whether in the treble, bass, or tenor, clef.

Since the various instruments of the average band, orchestra, or ensemble, are of different absolute pitch while playing, it is obvious that each individual species of instrument, plays in a different key, and a composition of music is scored accordingly.

However, it is not a simple matter for the leader to memorize or know the proper keys of the different instruments. There are times though, when it is highly desirable to have such information instantly at hand.

One instance, for example, is when a group of juvenile performers are being trained for ensemble work. Here the leader should know the relative keys in which the different instruments are to play for the composition at hand, and it is sometimes confusing to rapidly calculate and check the players on this point. This therefore, has led to the development of a simple, inexpensive and dependable indicator which is made to show at a glance without confusion, the respective keys for instruments playing from the bass, tenor and treble clefs.

An equally important object and use, is predicated upon the provision of a device which may be utilized for transposing, the device being easy and simple to manipulate, and such that an instrumentalist, given the concert key, of a musical composition, can quickly determine the key in which any particular instrument should play to be in accord therewith.

The invention is further useful to amateurs and students of the musical art, who desire to master instrumental transposition of songs, or other musical compositions, and in order to easily and quickly find the proper key signatures for each differently pitched instrument, which takes part in the ensemble.

In fact, the device is regarded as highly successful by performers who double on instruments, particularly of the reed family. For instance the clarinet and the saxophone, wherein it becomes necessary for the performer to play on instruments in C, B-flat, and E-flat. In modern dance orchestrations, a performer of this class will find a device of this type especially useful in rapidly changing from A and B-flat clarinet, to alto, tenor, and soprano saxophones.

Other uses, advantages, and features of the invention will become more readily apparent from the following description and drawings.

In the drawings:—

Figure 1 is a top plan view showing one position of the rotary indicator on the relatively stationary charted dial.

Fig. 3 is a top plan view of the charted dial, or base.

Figure 2:
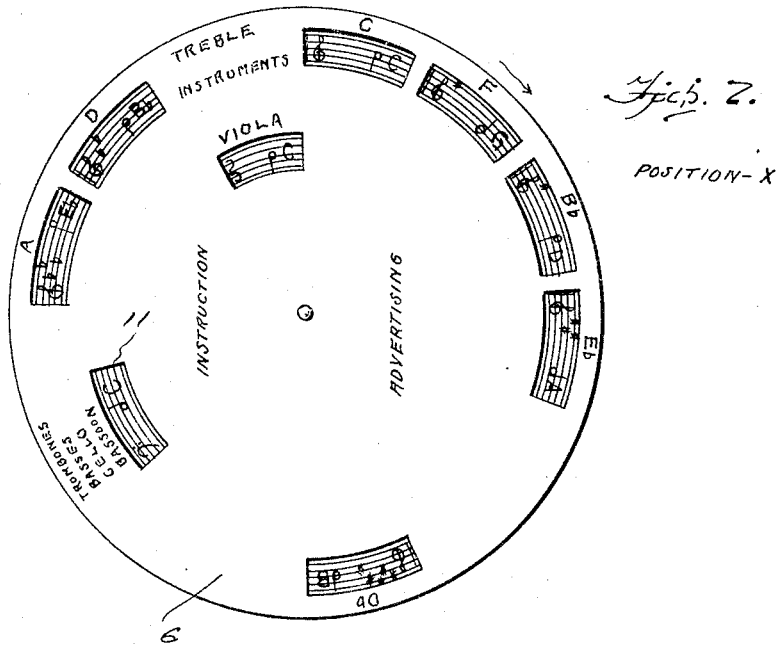
Fig. 2 is a view like Fig. 1, on a slightly enlarged scale, showing a second position, merely to illustrate the example in the computation based on Fig. 1.
Figure 4:
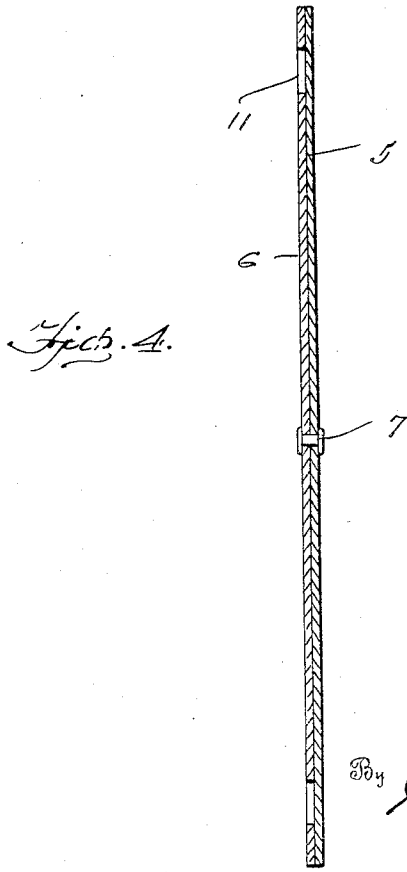
Fig. 4 is a central sectional view through the complete structure.

In carrying out the invention, I have simplified the structure, so that it is composed of but two main parts; namely, a relatively stationary disk-like dial 5 and a correspondingly shaped relatively movable indicator 6. These are pivoted together at their centers, as at 7. The construction of the dial 5, is clearly observed in Fig. 3. Reference being had to this figure, it will be seen that the dial is especially charted with musical indicia, whereby the user may determine the facility and expediency and accuracy and desired results based on at least three different musical clefs.

For instance, the reference character 8 designates an inner circle, 9 designates an intermediate circle, and 10 an outer marginal circle. These are disposed in radial spaced concentric relation in order that they may register with the correspondingly located sight openings 11, in the relatively rotatable indicator. With this arrangement, a complete charted result is assured.

For example, it is plainly evident from the legends printed on the out-side of the rotary indicator that the results are provided for all instruments, employed in the average band, and orchestra. Incidentally I would state at this time, that I am aware that it is not broadly new to provide a musical chart of this general character which is characterized by the presence of a charted dial, and a rotary indicator. For this reason, I emphasize the completeness of the invention herein described in that it is more successful and less confusing than prior art devices known to me because of the fact that it shows instantly, at a glance, and with great accuracy, the relative keys of practically all of the instruments in the ensemble, whether it be a band or an orchestra.

Referring again to the reference numerals 8, 9 and 10, I would state that 8 designates an ordinary circular staff divided by radial lines into individual bars of a length adapted to register and correspond with cooperating sight openings 11 on the rotary indicator. These bars are distinguished in that they include the proper clef signature 12, and the key into 13, which indicates the beginning of the particular scale represented by the character.

Each of the rings 9 and 10 are of the same character, in that they are divided by radial lines into bars, each bar containing an appropriate signature, as well as corresponding musical notation. However, we will distinguish the tenor clef circle 8, from the two outer circles by referring to the intermediate circle 9 as the bass circle, and the outer marginal circle 10 as the treble circle.

The windows 11 in the movable indicator are of course of segmental shape and individually spaced so that they will cooperate and register with the distinguishable bars of the different clef circles.

Particularly, do I emphasize the utilization of proper indicia and legend characters on the exterior of the rotary indicator to facilitate adjustment and quick determination of the desired result, and it is obvious that the outer row of segmental sight openings 11 register with the circle 10. The single intermediate sight opening registers with the intermediate bass circle 9, and the remaining short segmental sight opening registers with the tenor clef circle 8.

It follows therefore, that I have printed or otherwise displayed legends on the indicator to clearly distinguish the treble, bass, and tenor clefs. In addition, to the sight openings, I have displayed the word "Viola" in conjunction with the tenor clef sight opening, and on the bass clef sight opening I have displayed the words Basses, Trombones, Cello, etc. Accordingly, the remaining of the marginal sight openings are distinguished by the notation "Treble instruments."

It is an easy matter for one having a basic knowledge of musical scales, staffs and notations, as signatures to use this appliance. I therefore represent but a single usage of the device, believing that this is sufficient to illustrate any and all positions of the indicator with respect to the dial.

For example, Fig. 1, shows what may be distinguished as position XA. Incidentally, cooperating with various sight openings of the treble row, are the characters C F B-flat and so on. In this position, assuming that the piano, melody saxophone, or clarinet, and violin, are to play a given musical composition in the key of E-flat, and it is desired to determine the relative playing key of the viola, base instruments, in F, E-flat and so on, the indicator is arranged in position XA in Fig. 1.

Here, the C instruments play in E-flat. The F horns, play in B-flat. The B-flat trumpet, clarinet, plays in F, and the E-flat baritone saxophone in C. Accordingly, the viola is playing in E-flat; tenor clef, and the bass instruments in E-flat bass clef.

Transposing the indicator however, to the position X in Fig. 2, a different result is immediately obtained. Now the treble instruments are playing in the key of C, the F instrument in the key of G, the B-flat instruments in the key of D and so on. Obviously, in order to attain this result, the charted indicia on the dial is tabulated in a progressive manner with the sharp keys, beginning after the key of C at X, in Fig. 3, and the flat keys tabulated in the opposite or counter-clockwise direction.

It is to be emphasized in conclusion that the gist of the invention here, is in having the individual sight openings of a corresponding length to the bars on the dial so that only the desired key notations will be exposed in the different positions of the indicator on the dial. This insures instantaneous and accurate information, and avoids possible confusion, particularly for students of music.

Having thus described my invention, what I claim as new is:—

As a new product of manufacture, a musical key indicating chart comprising a relatively stationary dial having its top surface marked to provide a central viola clef circle, an outer marginal treble clef circle, and intervening bass clef circle, said circles each including an endless staff divided by radial lines into individual bars, and each bar embracing a proper key signature and corresponding musical notation; and a relatively movable indicator centrally pivoted upon said dial and equipped with a plurality of individual sight openings arranged in sequence and radially spaced order to separately register with the aforesaid circles, and said sight openings having properly tabulated legends to accurately indicate different relative keys and the different instruments in all of the aforementioned clefs.

In testimony whereof I affix my signature.

(Dr.) STEPHEN J. ROELIKE.